United States Patent [19]

Matsuo et al.

[11] Patent Number: 4,788,287

[45] Date of Patent: Nov. 29, 1988

[54] HIGH PERFORMANCE WATER AND OIL REPELLANT

[75] Inventors: Masashi Matsuo; Masayuki Tamura; Katsuji Ito, all of Yokohama, Japan

[73] Assignee: Asahi Glass Company Ltd., Tokyo, Japan

[21] Appl. No.: 903,197

[22] Filed: Sep. 3, 1986

[30] Foreign Application Priority Data

Sep. 17, 1985 [JP] Japan .................. 60-203485

[51] Int. Cl.$^4$ .................................. C07D 251/30
[52] U.S. Cl. .................. 544/196; 544/197; 544/198; 544/222; 548/966; 549/473; 549/496; 558/232; 558/239; 558/240; 558/241; 560/25; 560/115; 560/158; 564/38; 564/50; 564/57; 564/59
[58] Field of Search .......... 544/222, 196, 197, 198; 558/232, 239, 240, 241; 560/25, 115, 158; 564/38, 50, 57, 59; 548/966; 549/473, 496

[56] References Cited

U.S. PATENT DOCUMENTS 3,398,182 8/1968 Guenthner et al. .................. 558/239

FOREIGN PATENT DOCUMENTS 0103752 3/1984 European Pat. Off. .............. 564/38
2415150 10/1975 Fed. Rep. of Germany ....... 544/197
2062244 6/1971 France .................. 560/26
994411 6/1965 United Kingdom .............. 560/158
1011976 12/1965 United Kingdom .............. 524/390

OTHER PUBLICATIONS

Nippon Mektron K. K., *CA* 100:211594t, vol. 100 1984.
Dainippon Ink and Chemicals, vol. 100, *CA.* 100:211595u, 1984.
Asahi Glass Co (I) *C.A.*, vol. 100, 100:211596v, 1984.
Asahi Glass Co.(II), *C.A.*, vol. 100, 100:211597w, 1984.

*Primary Examiner*—Richard A. Schwartz
*Attorney, Agent, or Firm*—Oblon, Fisher, Spivak, McClelland & Maier

[57] ABSTRACT

A high performance water and oil repellant composed of a compound comprising at least two terminal segments and an intermediate segment connecting the terminal segments and having a molecular weight of from 800 to 20,000, each terminal segment containing at least one polyfluoroalkyl group connected by a —CONH— linking group, said intermediate segment being a urethane oligomer containing at least two —CONH— linking groups in one molecule, and said terminal segments and intermediate segment being connected by a —CONH— linking group.

1 Claim, No Drawings

HIGH PERFORMANCE WATER AND OIL REPELLANT

The present invention relates to a high performance water and oil repellant composed of a certain specific compound containing polyfluoroalkyl groups, which is capable of providing particularly high water repellency.

Heretofore, in order to impart stain-proofing properties to fibrous fabrics, it has been common to treat the fabrics by utilizing the water and oil repellent properties of polyfluoroalkyl groups. Thus, various water and oil repellent treating agents have been proposed which are composed of polyfluoroalkyl group-containing compounds or polymers. For instance, high molecular weight polymer-type water and oil repellants are known which are represented by copolymers composed essentially of perfluoroalkyl group-containing acrylates or methacrylates. Further, low molecular weight compound-type water and oil repellants are known which are represented by polyfluoroalkyl group-containing urethane compounds, and which are useful for the treatment of carpets to impart stain-proofing properties particularly against dry soils.

In recent years, there has been an increasing demand for multi-function and high performance of such polyfluoro-alkyl group-containing water and oil repellants. For instance, in order to impart durable high water repellency to a cloth woven with fine denier yarns by a conventional water and oil repellant, it is required to treat the cloth with the highly concentrated repellent, whereby the fiber texture is likely to be considerably impaired. Conventional water and oil repellants have a limitation particularly with respect to the water repellency, and none of them fully satisfies the high level of requirements demanded in recent years.

On the other hand, for the purpose of improving the abrasion resistance or anti-dry soil properties of polyfluoroalkyl group-containing high molecular weight treating agents, polyfluoroalkyl group-containing urethane compounds as mentioned above, have been proposed, for instance, in U.S. Pat. No. 3,398,182 and Japanese Unexamined Patent Publications No. 112855/1978 and No. 74000/1979. Further, for the purpose of improving the performance, fluorine-containing urethane compounds derived from polyfunctional isocyanate compounds having at least trifunctional groups, have been proposed, for instance, in Japanese Unexamined Patent Publications No. 189283/1983, No. 189284/1983 and No. 33315/1984.

However, such conventional polyfluoroalkyl group-containing urethane compounds have difficulties such that the water repellency is not necessarily adequate, and it is difficult to adequately protect interior articles such as carpets from aqueous stains which are practical problems.

Accordingly, it is an object of the present invention to overcome the above-mentioned problems and to provide a water and oil repellent treating agent which is capable of imparting high water repellency at a low concentration not only to ordinary fabrics but also to fiber products made of fine denier yarns, and which provides adequate durability against washing or dry cleaning.

Another object of the present invention is to provide a water and oil repellent treating agent which is capable of providing excellent abrasion resistance and anti-dry soil properties as well as practically adequate water repellency, in the treatment of e.g. carpets.

The present inventors have conducted various studies and researches on the conventional fluorine-containing urethane type water and oil repellants, and as a result, have made the following interesting discoveries. Namely, it has been found that a compound obtained by connecting at least two molecules of a polyfluoroalkyl group-containing urethane compound by a certain specific urethane oligomer type molecular chain and having a molecular weight within a certain specific range, is capable of providing a very high level of water repellency without impairing other properties such as oil repellency and stain-proofing properties. For instance, a polyfunctional isocyanate compound is reacted with e.g. a polyfluoroalkyl group-containing alcohol to obtain a urethane compound containing a polyfluoroalkyl group and an isocyanate group, and the isocyanate group of the urethane compound is reacted with a urethane oligomer compound having active hydrogens at its both ends to obtain a compound having a terminal group of a polyfluoroalkyl group-containing urethane compound bonded by a —NHCO— linking group at each end of the urethane oligomer type molecular chain. Such a compound having a specific intermediate linking molecular chain is capable of providing higher water repellency than the conventional fluorine-containing urethane compounds having no such an intermediate linking molecular chain. Further, when the intermediate linking molecular chain is an oxyalkylene molecular chain as disclosed in e.g. Japanese Unexamined Patent Publication No. 84824/1976 or No. 82572/1982, some difficulties such that the water repellency is inadequate or the anti-soil properties tend to deteriorate, have been observed. Whereas, with the urethane oligomer type molecular chain having at least two —NHCO— linking groups in the molecule according to the above discovery, an extremely high level of water repellency can be obtained.

Thus, the present invention has been accomplished on the basis of the above discoveries, and provides a high performance water and oil repellant composed of a compound comprising at least two terminal segments and an intermediate segment connecting the terminal segments and having a molecular weight of from 800 to 20,000, each terminal segment containing at least one polyfluoroalkyl group connected by a —CONH— linking group, said intermediate segment being a urethane oligomer containing at least two —CONH— linking groups in one molecule, and said terminal segments and intermediate segment being connected by a —CONH— linking group.

Now, the present invention will be described in detail with reference to the preferred embodiments.

In the present invention, it is important that the water and oil repellant is composed of a compound comprising the specific terminal segments and the specific intermediate segment. Each of such segments can be obtained by a reaction of an isocyanate group-containing compound with an active hydrogen group-containing compound. Further, it is important that the specific terminal segments and the specific intermediate segment are connected by —CONH— linking groups. This connection is formed by a reaction of the isocyanate group and the active hydrogen group. Accordingly, each specific terminal segment contains a polyfluoroalkyl group connected by a —CONH— linking group, and the specific intermediate segment is made of a urethane oligomer containing at least two —CONH— linking groups in one molecule. It is important that at least two such specific terminal segments are connected to the specific intermediate segment by —CONH— linking groups.

The compound of the present invention having the above-mentioned construction and a molecular weight of from 800 to 20,000, can be prepared by various synthetic routes. Usually, however, the specific compound of the present invention can be obtained by preparing the specific terminal segment compound and the specific intermediate segment compound so that one of the segments have an isocyanate group and the other segment has an active hydrogen group, and then reacting the two segment compounds. It is preferred to employ a method wherein a polyfunctional isocyanate compound is reacted with an active hydrogen compound having a polyfluoroalkyl group, if necessary further with another active hydrogen compound, to form a polyfluoroalkyl group-containing isocyanate having at least one —NCO group (i.e. the terminal segment member), then a polyvalent active hydrogen compound is reacted with a polyfunctional isocyanate compound to form an urethane oligomer having at least two active hydrogen groups (i.e. the intermediate segment member), and the two segment members are connected by the reaction of the isocyanate group with the active hydrogen group. Otherwise, it is possible to employ a method wherein a trifluoroalkyl group-containing isocyanate as mentioned above (i.e. the terminal segment member) is reacted with a polyvalent active hydrogen compound and a polyfunctional isocyanate compound so that the formation of the intermediate segment member and the connection of the two segments are conducted in one reaction system. Likewise, it is possible to employ a method wherein the above-mentioned intermediate segment member is reacted with a polyfluoroalkyl group-containing active hydrogen compound and a polyfunctional isocyanate compound so that the formation of the above-mentioned terminal segment member and the connection of the two segment members are conducted in one reaction system. It is of course permissible to react the starting material compounds used for the preparation of the above-mentioned two segment members all together so that the formation of the respective segment members and the connection of the two segment members are conducted in one reaction system, so long as it is thereby possible to obtain a compound having the specific structure and molecular weight according to the present invention.

In addition, in the present invention, it is possible to employ a method wherein, contrary to the above-mentioned preferred manner of synthesis, at least one active hydrogen group is left in the terminal segment member, and at least two —NCO groups are left in the intermediate segment member, and the two segment members are reacted with each other. Likewise, it is possible to employ a method wherein active hydrogen groups are left in both segment members, and such segment members are connected by a polyfunctional isocyanate compound. Likewise, it is possible to employ a method wherein isocyanate groups are left in both segment members, and such segment members are connected by a polyvalent active hydrogen compound.

The compound having the specific structure and molecular weight of the present invention can be prepared by various synthetic routes as described above. Now, specific manners for the preparation will be described as typical examples for the above-mentioned preferred embodiments.

As the polyfunctional isocyanate compound which may be employed for the formation of the specific terminal segment and intermediate segment according to the present invention, various compounds may be employed without any particular restrictions, so long as they are bifunctional or higher functional. For instance, there may be mentioned bifunctional isocyanate compounds including aromatic isocyanates such as 2,4-tolylenediisocyanate, 4,4'-diphenylmethanediisocyanate, tolidinediisocyanate and dianisidinediisocyanate; alicyclic diisocyanates such as 2-methyl-cyclohexane-1,4-diisocyanate, isophoronediisocyanate and hydrogenated MDI

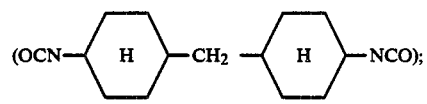

and aliphatic diisocyanates such as hexamethylenediisocyanate and decamethylenediisocyanate. These compounds may be represented by the formula OCN—Y—NCO. When two OCN—Y—NCO are reacted in the presence of water, a dimer of the formula OCN—Y—NHCONH—Y—NCO will be formed. The bifunctional isocyanate compounds include such a dimer. In addition to the bifunctional isocyanate compounds, polyfunctional isocyanate compounds such as trifunctional, tetrafunctional or pentafunctional isocyanate compounds may be mentioned. Specific examples of trifunctional isocyanate compounds include, in addition to the after-mentioned compounds, a trimer of the formula

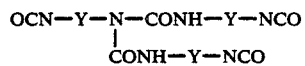

obtained by reacting the above-mentioned dimer of the formula OCN—Y—NHCONH—Y—NCO with a monomer of the formula OCN—Y—NCO, and a tetramer of the formula

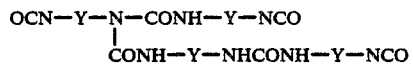

obtained by reacting two dimers and having three—NCO groups. Examples of other three functional isocyanate compounds include:

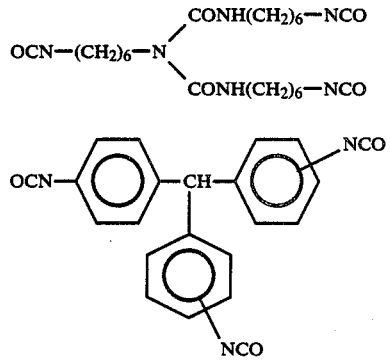

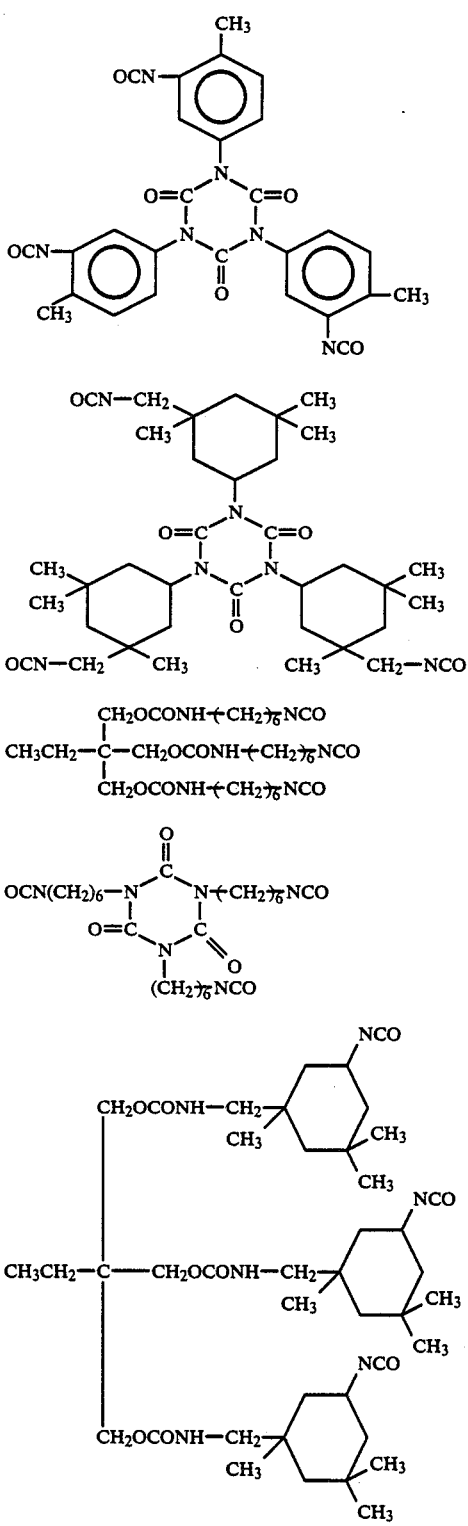

In the present invention, for the formation of the specific terminal segment, it is preferred to employ a trifunctional isocyanate compound among the above-mentioned polyfunctional isocyanate compounds. Particularly preferred is an aliphatic trifunctional isocyanate compound. On the other hand, as the polyfunctional isocyanate compound to be used for the formation of the specific intermediate segment, it is usually preferred to employ an aromatic polyfunctional isocyanate compound, particularly a bifunctional aromatic isocyanate compound, to obtain high water repellency. For the formation of the respective segments, it is of course possible to employ a combination of two or more polyfunctional isocyanate compounds different in the types, in the functionality or in the number of functional groups. Likewise, it is possible to employ a mixture of the above-mentioned preferred polyfunctional isocyanate compounds with isocyanate compounds having higher functionalities.

For the formation of the specific terminal segment, the polyfluoroalkyl group-containing active hydrogen compound to be used for the reaction with the above-mentioned polyfunctional isocyanate compound, includes compounds represented by the formula $R_f$—X—A—H. As such $R_f$—X—A—H, a fluorine-containing alcohol of $R_f$—R—OH type is preferably employed. Further, a fluorine-containing thioalcohol of $R_f$—R—SH type where A is —S—, may also be employed. Likewise, a fluorine-containing amine where A is —N(R$^2$)—, may be employed. It is of course possible to employ, as a starting material, a mixture of fluorine-containing alcohols which are different from one another in the number of carbon atoms, in $R_f$ or in the type of R.

In the above formula, $R_f$ is usually a straight chain or branched polyfluoroalkyl group having from 1 to 20 carbon atoms, preferably from 4 to 16 carbon atoms. It is usual to employ a compound wherein the terminals are perfluoroalkyl groups. However, it is possible to employ a compound wherein the terminals contain hydrogen atoms or chlorine atoms, or oxyperfluoroalkylene-containing groups. A preferred example of $R_f$ is a perfluoroalkyl group of the formula $C_nF_{2n+1}$ wherein n is an integer of from 4 to 16. The perfluoroalkyl group wherein n is from 6 to 12 is particularly preferred. X is —R—, —CON(R$^1$)—Q— or —SO$_2$N(R$^1$)—Q— wherein R is a bivalent alkylene group, R$^1$ is a hydrogen atom or a lower alkyl group, and Q is a bivalent organic group. X is preferably a bivalent alkylene group having from 1 to 10 carbon atoms, particularly a bivalent alkylene group having from 2 to 4 carbon atoms. Q is a bivalent organic group. Usually, a bivalent alkylene group of —R— is mentioned as a preferred example.

In the present invention, if necessary, other active hydrogen compounds represented by the formula Z—A$^1$—H may be employed together with the $R_f$ group-containing active hydrogen compound such as $R_f$—X—A—H. As in the case of the above-mentioned $R_f$—X—A—H, Z—A$^1$—H includes an alcohol where A$^1$ is —O—, a thioalcohol where A$^1$ is —S—, and an amine where A$^1$ is —N(R$^2$)—. For instance, the water repellency of the water and oil repellant of the present invention can further be improved by using a straight chain stearyl group-containing active hydrogen compound such as n—C$_{18}$H$_{37}$OH, n—C$_{18}$H$_{37}$SH or n—C$_{18}$H$_{37}$NH$_2$, as Z—A$^1$—H. Further, in order to further improve the durability by improving the affinity with the surface of e.g. synthetic fibers as the object to be treated, it is possible to employ an alcohol such as

as Z—A¹—H. Furthermore, it may be an alkanolamine, a diamine or a combination of ammonia with a methylol modifying agent.

In the above formulas $R_f$—X—A—H and Z—A¹—H, each of A and A¹ is —O—, —S— or —N(R²)— wherein R² is a hydrogen atom or a monovalent organic group. From the viewpoint of availability, those wherein A is —O—, or A¹ is —O— or —N(R²)— are preferably selected. Z is a monovalent organic group, which may be the same as the above-mentioned R², or may form a ring together with R². For instance, —A¹—Z includes —OR' (wherein R' is an alkyl group, etc.), —NHCH₂OH, —NHCH₂CH₂OH,

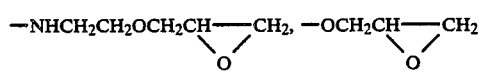

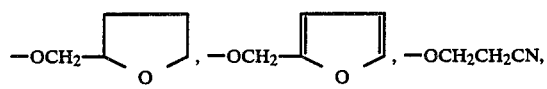

—OCH₂CH₂NO₂, —OCH₂CH₂OH, —N(CH₂CH₂OH)₂,

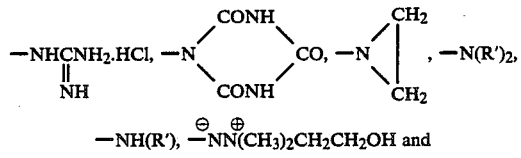

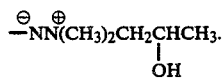

In the formula Z—A¹—H, Z is a monovalent organic group. As specific examples wherein X is an alkyl group, an aralkyl group or a alicyclic group, the following alcohols, thriolcohols or amines may be mentioned.

CH₃(CH₂)$_q$OH, [CH₃(CH₂)$_q$]₂CHOH, (CH₃)₃COH,

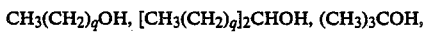

[CH₃(CH₂)$_q$]₂CHSH, CH₃(CH₂)$_q$NH₂, [CH₃(CH₂)$_q$]₂NH and

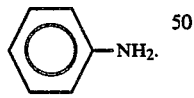

wherein q is an integer of from 0 to 30.

Next, as the polyvalent active hydrogen compound to be used for the reaction with the above-mentioned polyfunctional isocyanate compound for the formation of the specific intermediate segment, a compound containing at least two active hydrogen groups, such as a polyhydric alcohols, a polyvalent thioalcohol or a polyvalent amine, may be mentioned. For instance, there may be mentioned a bifunctional polyvalent active hydrogen compound such as

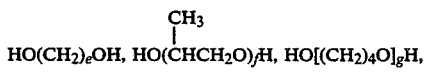

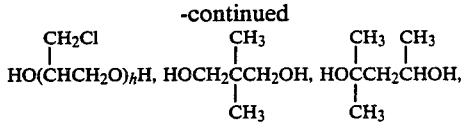

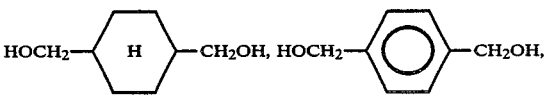

H₂N(CH₂)$_e$OH, CH₃(CH₂)$_i$NH(CH₂)₂NH(CH₂)$_i$CH₃,

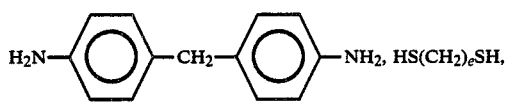

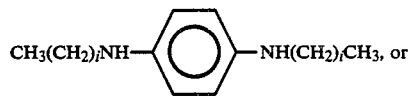

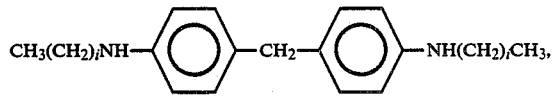

a trifunctional polyvalent active hydrogen compound such as

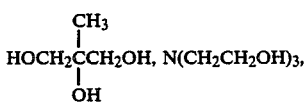

C₂H₅C(CH₂OH)₃, 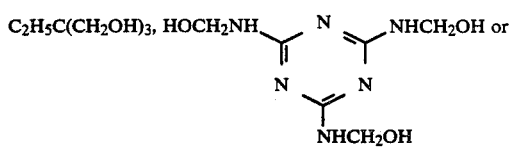

CH₃(CH₂)$_i$NH(CH₂)₂NH(CH₂)₂NH(CH₂)$_i$CH₃, a tetrafunctional polyvalent active hydrogen compound such as

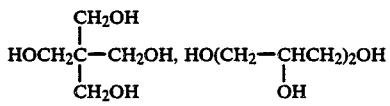

or CH₃(CH₂)$_i$NH(CH₂)₂NH(CH₂)₂NH(CH₂)₂NH(CH₂)$_i$CH₃, a pentafunctional or higher functional polyvalent active hydrogen compound such as

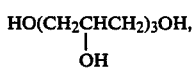

and partial alkyl or aryl esters, ethers or amides thereof. Of course, two more of these compounds may be employed together in combination. In the above formulas, e is an integer of from 1 to 20, each of f, g and h is an integer of from 1 to 50, and i is an integer of from 0 to 20.

In the present invention, the polyvalent active hydrogen compound to be used for the formation of the specific intermediate segment is preferably at most trifunctional. Particularly preferred is a bifunctional polyvalent active hydrogen compound. Such a polyvalent active hydrogen compound preferably has at least two methylene chains, particularly from 2 to 12 methylene chains, to obtain high water repellency. When a tetrafunctional or higher functional polyvalent active hydrogen compound is employed, gel is likely to form during the reaction, such being undesirable.

In the present invention, the polyvalent active hydrogen compound to be used for the formation of the specific intermediate segment is preferably a compound represented by the formula H—$A^2$—B—$A^2$—H. In this formula, $A^2$, like the above-mentioned A or $A^1$, is —O—, —S— or —N($R^2$)— wherein $R^2$ is a hydrogen atom or a monovalent organic group. Preferably, $A^2$ is —O—. B is a bivalent organic residue obtained by removing from the above-mentioned bifunctional polyvalent active hydrogen compound the two $A^2$—H groups, and in some cases, B may have another organic group bonded by $A^2$. Preferably, B is a bivalent organic residue containing at least two methylene chains, particularly from 2 to 12 methylene chains.

The reaction for forming the terminal segments and intermediate segment by using the above-mentioned starting materials, and the reaction for connecting such segments, may be conducted under various reactions conditions by using various apparatus for the reactions. A typical example will be described with reference to a reaction of a fluorine-containing alcohol of the formula $R_f$—X—A—H with a polyfunctional isocyanate compound. The reaction temperature is usually from 0° to 200° C., preferably from 40° to 100° C. The reaction is preferably conducted in an inert organic solvent. However, in some cases, the reaction may be conducted without using an inert organic solvent. Here, the inert organic solvent is preferably the one capable of dissolving the starting material polyfunctional isocyanate compound. For instance, there may be mentioned a halogenated hydrogen carbon such as 1,1,1-trichloroethane, trichloroethylene, trichloromethane or trichlorotrifluoroethane; a hydrocarbon such as benzene, toluene or hexane; an ether such as dioxane, tetrahydrofuran, diethyl ether, dimethoxy ethane or diethylene glycol dimethyl ether; a ketone such as acetone, methyl ethyl ketone or methyl isobutyl ketone; an ester such as ethyl acetate or butyl acetate; dimethylformamide; dimethylsulfoxide; or acetonitrile. The uniform reaction can smoothly be conducted by using such an inert organic solvent. Such an inert organic solvent is used usually in an amount of from 1 to 50 mols, preferably from 5 to 20 mols, per 1 mol of the starting material isocyanate compound.

The above reaction is advantageously conducted substantially in the absence of water to prevent side reactions. Namely, the presence of water is disadvantageous to —NCO groups. For instance, it is desirable to conduct adequate control of moisture in the starting materials or in the apparatus, and to conduct the reaction in an inert gas stream such as dry nitrogen. Such a reaction proceeds smoothly and advantageously in the presence of a catalyst composed of a salt of alkyl tin such as dibutyl tin dilaurate or a compound having a pKa of at least 5.0, preferably from 7 to 10. As such a catalyst, various catalysts may be mentioned, but it is preferred to employ a tertiary amine such as trimethylamine, triethylamine, tripropylamine, tributylamine, triallylamine, N-methylpiperidine, N-methylpyrrolidine, N-methylmorpholine, N-ethylmorpoline, N,N-dimethylbenzylamine, pyridine, 4-methylpyridine, dimethyllaurylamine, dimethylmyristylamine, dimethylstearylamine, tricaprylamine, methyldistearylamine, methyldilaurylamine, dimethylcaprylamine, dimethylpalmitylamine, tetramethylpropylenediamine or pentamethyldiethylenetriamine. Further, an alkali metal alcoholate, inorganic alkali metal salt, inorganic alkaline earth metal salt or ammonium salt having a pKa of at least 5.0, and an inorganic or organic salt of a metal such as tin, cobalt, iron, titanium, zinc, antimony or lead, may also be employed as the catalyst. The amount of the catalyst is usually from 0.001 to 10 parts by weight, preferably from 0.3 to 3 parts by weight, relative to 100 parts by weight of the starting material isocyanate compound.

The terminal segment, the intermediate segment and the $R_f$ urethane compound having the specific structure and molecular weight (hereinafter referred to simply as a specific $R_f$ urethane compound) prepared by the above-mentioned various synthetic routes, are preferably represented by the following formulas. Namely, a preferred example of the specific terminal segment of the present invention is represented by the formula:

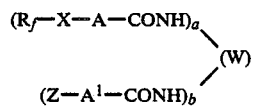

Likewise, the intermediate segment is preferably represented by the formula:

The specific $R_f$ urethane compound is preferably represented by the formula:

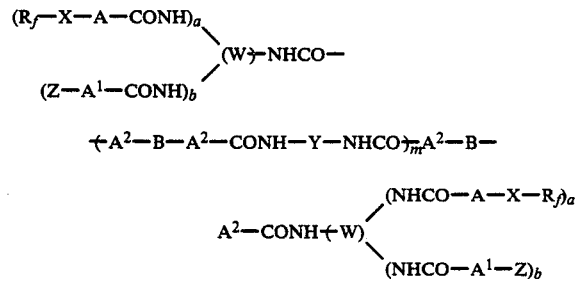

In these formulas, $R_f$, X, Z, A, $A^1$, $A^2$ and B are as defined above. W is a t-valent residue obtained by removing from a t-functional isocyanate compound having t —NCO groups, the t —NCO groups. As mentioned above, a trivalent organic group where t is 3, is preferred. Further, W is preferably a residue derived from an aliphatic polyfunctional isocyanate compound. And, a is an integer of from 1 to 5, b is an integer of from 0 to 4, and a +b is an integer of from 1 to 5. Preferably, a is 1 or 2, b is 0 or 1, and a +b is 2. As mentioned above, Y is preferably a bivalent organic residue obtained by removing from a bifunctional isocyanate compound having two —NCO groups the two —NCO groups, and particularly preferred is a residue derived from an aromatic polyfunctional isocyanate compound. In the formation of the intermediate segment, it is possible to employ a trifunctional polyvalent active hydrogen compound or a trifunctional isocyanate compound. In such a case, B may have another organic group bonded by $A^2$, or Y may have another organic group such as a $R_f$—X—A— group or a Z—$A^1$— group, bonded by a —CONH— group. The symbol m is an integer of from 1 to 50, and it is preferably selected from integers of from 1 to 10.

The molecular weight of the specific $R_f$ urethane compound of the present invention having the above-mentioned structure, is usually from 800 to 20,000, preferably from 1,000 to 10,000. If the molecular weight is too small, the water and oil repellency deteriorates remarkably by washing or dry cleaning. On the other hand, if the molecular weight is too high, there will be difficulties such that the initial performance is poor, and the stains once attached are hardly removable.

In the present invention, the specific $R_f$ urethane compound can be used in the form of an organic solution or an organic dispersion. Further, from the viewpoint of the application to a dyeing process or the influence to the working environment, it is particularly advantageous to use it in the form of an aqueous dispersion. In this case, various surfactants such as nonionic, anionic, cationic or amphoteric surfactants, may be employed as the dispersant. These surfactants may be used in combination. Further, an organic solvent may be used together in order to facilitate the dispersion of the specific $R_f$ urethane compound. As the organic solvent to be used in combination for the dispersion into water, there may be mentioned a water soluble ether such as dioxane, tetrahydrofuran or ethyl propyl ether; a water soluble glycol ether such as diethylene glycol dimethyl ether, diethylene glycol diethyl ether, ethylene glycol monomethyl ether, ethylene glycol monoethyl ether, ethylene glycol monopropyl ether, ethylene glycol monobutyl ether, ethylene glycol monophenyl ether, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether or triethylene glycol monobutyl ether; an amide such as formamide, dimethylformamide or acetamide; a ketone such as acetone, methyl ethyl ketone, methyl isopropyl ketone, methyl isobutyl ketone or diacetone alcohol; an alcohol such as methanol, ethanol, propanol or butanol; and an ester such as methyl acetate, ethyl acetate, propyl acetate or butyl acetate. Such an organic solvent is added usually in an amount of from 10 to 300 parts by weight, preferably from 20 to 150 parts by weight, relative to 100 parts by weight of the specific $R_f$ urethane compound.

When the water and oil repellant of the present invention is in the form of an aqueous dispersion, the concentration of the solid content of the specific $R_f$ urethane compound is not particularly limited, but it is adjusted usually to a level of from 5 to 60% by weight, preferably from 10 to 50% by weight. For the treatment, this dispersion is used in a state diluted with water to a concentration of from 0.4 to 4% by weight. Such an aqueous dispersion type treating agent is advantageous over the organic solvent type in that the flash point of the dispersion is higher, and the concentration of the solid content can be made higher. Further, it has various advantage such that the pollution to the working environment for the treatment can be minimized.

There is no particular restriction as to the articles to be treated by the water and oil repellant of the present invention, and various articles may be mentioned, including fibrous fabrics, glass, ceramics, paper, wood, leather, fur, asbestos, bricks, cement, metals and their oxides, porcelains, plastics, coated surfaces and plasters. As the fibrous fabrics, fabrics made of animal or plant natural fibers such as cotton, wool or silk; various synthetic fibers such as polyamide, polyester, polyvinyl alcohol, polyacrylonitrile, polyvinyl chloride or polypropylene; semisynthetic fibers such as rayon or acetate; inorganic fibers such as glass fiber, ceramics fibers or asbestos fiber; or a mixture of these fibers, may be mentioned. Fiber products made of polyamide fiber (nylon) taffeta fine denier and interior articles such as carpets, living room appliances, drapes, wall papers or interior decorations of vehicles, may be mentioned as particularly preferred particles to be treated.

There is no particular restriction as to the manner for the application of the water and oil repellant of the present invention, and well-known or conventional various methods may be employed for the application. For instance, it may be deposited on or absorbed in the surface of the article to be treated, by a known coating method such as dipping, spraying or coating, followed by drying. Further, at the time of the application, various treating agents and additives such as an antistatic agent, an insecticide, a flame retardant, a dyestuff stabilizer and an anti-crease agent, may also be incorporated.

Now, the present invention will be described in further detail with reference to Examples. However, it should be understood that the present invention is by no means restricted by these specific Examples. Unless otherwise specified, "%" and "parts" mean "% by weight" and "parts by weight", respectively.

In the following Examples and Comparative Examples, the water repellency and the oil repellency were measured in the following manners. Namely, water repellency-I was evaluated by placing a few drops of an aqueous isopropanol solution having the composition as shown in Table 1, on a sample cloth, and is represented by the point representing the maximum concentration at which the aqueous solution was maintained without soaking into the cloth. Water repellency-II is represented by water repellency No. as identified in Table 2 in accordance with the spray method of JIS L-1005. The oil repellency was determined by placing a few drops (a diameter of about 4 mm) of the test solution as shown in the following Table 3, on a sample cloth at two locations, and evaluating the infiltration condition upon expiration of 30 seconds (AATCC-TM 118-1966).

TABLE 1

| Water repellency-I | Isopropanol concentration (% by volume) in an aqueous isopropanol solution |
|---|---|
| 11 | 100 |
| 10 | 90 |
| 9 | 80 |
| 8 | 70 |
| 7 | 60 |
| 6 | 50 |

TABLE 1-continued

| Water repellency-I | Isopropanol concentration (% by volume) in an aqueous isopropanol solution |
|---|---|
| 5 | 40 |
| 4 | 30 |
| 3 | 20 |
| 2 | 10 |
| 1 | 0 |
| 0 | Incapable of maintaining water drops |

TABLE 2

| (Water repellency-II) Water repellency No. | State |
|---|---|
| 100 | No wetting is observed on the front surface. |
| 90 | Slight wetting is observed on the front surface. |
| 80 | Partial wetting is observed on the front surface. |
| 70 | Wetting is observed on the front surface |
| 50 | Wetting is observed on the entire front surface. |
| 0 | Complete wetting is observed on the front and back surfaces. |

TABLE 3

(AATCC-TM 118-1966)

| Oil repellency | Test solution | Surface tension dyne/cm, 25° C. |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | Hexadecane 35/Nujol 65 mixed solution | 29.6 |
| 1 | Nujol | 31.2 |
| 0 | Poorer than 1 | |

The durability was evaluated by conducting the washing in accordance with JIS L-0217-103 or the dry cleaning in accordance with AATCC-TM 86(1970), and measuring the degree of deterioration of the water and oil repellency. Namely, the washing was conducted by using a household electric washing machine with a capacity of 20 liters and using a cleanser (Blue Dia, tradename) in such a manner that one operation comprises washing at 40° C. for 10 minutes, rinsing for 10 minutes and drying. Likewise, the dry cleaning was conducted in such a manner that one operation comprises stirring in tetrachloroethylene containing 1% by volume of a cleanser (Lipearl P, tradename) at 25° C. for 8 minutes, and then drying. In each case, the water and oil repellency after a prescribed number of operations was measured.

For the determination of the stain-proofing property, a sample cloth was cut into a sample of 5×7 cm, and the sample and a dry dust as shown in the following Table 4 (in an amount twice the weight of the sample) were put in a container and vigorously mixed for 3 minutes for staining. After the staining operation, an excess dust was removed by an electric cleaner, and the reflectance was measured to evaluate the staining rate. The staining rate was calculated in accordance with the following equation.

Staining rate (%)=$(R_1-R_2)/R_0 \times 100$ where
$R_1$: reflectance of non-stained cloth
$R_0$: reflectance of stained cloth which was treated
$R_2$: reflectance of stained cloth which was nontreated

TABLE 4

| Dust | % by weight |
|---|---|
| Peat moss | 38 |
| Cement | 17 |
| Kaolin clay | 17 |
| Silica | 17 |
| Carbon black | 1.75 |
| Ferric oxide | 0.50 |
| Mineral oil | 8.75 |

EXAMPLE 1

Into a 500 ml four necked flask equipped with a stirrer, a dropping funnel, a thermometer and a condenser, 84 g of Sumidur N-3200 (hexamethylenediisocyanate oligomer containing 40% of the trimer, isocyanate content: 22.6%, manufactured by Sumitomo Bayer Co.), 0.02 g of $Bu_2Sn(OCOC_{11}H_{23})_2$ and 290 g of butyl acetate, were charged. While maintaining the temperature at 70° C., 154.2 g of an alcohol of the formula $C_nF_{2n+1}C_2H_4OH$ wherein n is a mixture of 6, 8, 10 and 12, and has an average value of 9.0, was dropwise added over a period of 2 hours by means of the dropping funnel. The stirring was continued for 1 hour, and then 26.1 g of 2,4-tolylenediisocyanate and subsequently 26.6 g of 1,6-hexamethylene glycol, were added in 5 minutes. The temperature was raised to 90° C., and the reaction was continued for 2 hours, whereby the conversion was 100%. This was confirmed by the disappearance of the alcohol, glycol and isocyanate as ascertained by the gas chromatography and infrared spectrometer.

The average composition of the reaction product thus obtained, was as follows:

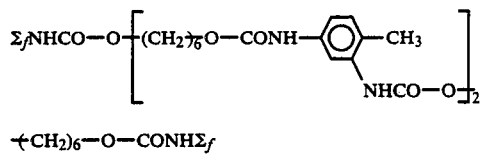

$+(CH_2)_6-O-CONH\Sigma_f$ wherein $\Sigma_f$ is $[C_nF_{2n+1}C_2H_4OCONH(CH_2)_6NH-CO]_2NCH_2)_6$.

0.8 g of the solution of this product was diluted to 200 g with a liquid mixture of acetone/tetrahydrofuran/trichlorotrifluoroethane (weight ratio of 40/40/20) to obtain a treating bath. Then, a nylon taffeta fine denier cloth (20×20 cm) was immersed therein, and then dried at 150° C. for 3 minutes. The treated cloth thus obtained showed an oil repellency of 5 and a water repellency-II of 100. This cloth showed an oil repellency of 4 and a water repellency-II of 90 after repeating the washing operation 10 times, and it showed an oil repellency of 3 and a water repellency-II of 90 after repeating the dry cleaning operation 10 times.

EXAMPLES 2 to 5

Various reaction products were prepared in the same manner as in Example 1, and a nylon taffeta fine denier cloth was treated with each of them. The results are shown in Table 5.

COMPARATIVE EXAMPLE 1

By using conventional

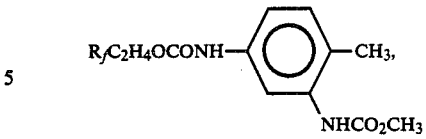

the preparation of the treating bath, the treating of a nylon taffeta fine denier cloth and the measurement of the properties, were conducted in the same manner as in Example 1. The results are shown in Table 5.

In Table 5, $\Sigma_f$ is $[C_nF_{2n+1}C_2H_4CONH(CH_2)_6NH\text{-}CO]_2N(CH_2)_6$, and $R_f$ is $C_nF_{2n+1}$, wherein n is a mixture of 6, 8, 10 and 12 and has an average value of 9.0, and the water repellency is water repellency-II.

TABLE 5

| | Structure | Oil repellency | Water repellency | Washing 10 times Oil repellency | Washing 10 times Water repellency | Dry cleaning 10 times Oil repellency | Dry cleaning 10 times Water repellency |
|---|---|---|---|---|---|---|---|
| Example 2 | $\Sigma_f\text{NHCO}_2\left[\begin{array}{c}\text{CH}_3\\ \bigcirc\\ \text{NHCO}_2\end{array}\right.\!\!\!\left.(\text{CH}_2)_{\overline{12}}\text{OCONH}\Sigma_f\right]_2$ | 3 | 100 | 3 | 90+ | 3 | 80 |
| Example 3 | $\Sigma_f\text{NHCONH}\left[\begin{array}{c}\text{CH}_3\\ \bigcirc\\ \text{NHCONH}\end{array}\right.\!\!\!\left.(\text{CH}_2)_{\overline{12}}\text{NHCONH}\Sigma_f\right]_2$ | 4$^-$ | 100 | 3$^+$ | 90 | 3$^+$ | 90 |
| Example 4 | $\Sigma_f\text{NHCO}_2(\text{CH}_2)_6\text{OCONH}\text{—}\bigcirc\text{—CH}_2\text{—}\bigcirc\text{—NHCO}_2(\text{CH}_2)_6\text{OCONH}\Sigma_f$ | 5 | 100 | 3 | 80 | 2 | 80 |
| Example 5 | $\Sigma_f\text{NHCO}_2\left[\begin{array}{c}\text{CH}_3\\ \bigcirc\\ \text{NHCO}\end{array}\!\!\!\text{—O}(\text{CH}_2)_2\text{OCONH}\text{—}\!\!\!(\text{CH}_2)_{\overline{12}}\text{NHCONH}\Sigma_f\right]_4$ | 5 | 90 | 4$^-$ | 70 | 4 | 80$^-$ |
| Example 6 | $\begin{array}{c}\text{CH}_3\\ \bigcirc\\ \Sigma_fC_2H_4\text{OCONH}\end{array}\!\!\!\text{NHCO}_2\!\!-\!\!(\text{CH}_2)_6\text{OCONH}(\text{CH}_2)_6\text{NHCO}_2]_3\!\!-\!\!(\text{CH}_2)_6\text{OCONH}\!\!-\!\!\begin{array}{c}\text{NHCO}_2C_2H_4\Sigma_f\\ \bigcirc\\ \text{CH}_3\end{array}$ | 2 | 90 | 1 | 80$^-$ | 1$^+$ | 80 |
| Comparative Example 1 | $R_fC_2H_4\text{OCONH}\!\!-\!\!\begin{array}{c}\text{CH}_3\\ \bigcirc\\ \text{NHCO}_2\text{CH}_3\end{array}$ | 1 | 50 | 0 | 0 | 0 | 0 |

EXAMPLE 7

Into a 300 ml four necked flask equipped with a stirrer, a dropping funnel, a thermometer and a condenser, 30 g of Sumidur N-3200 (hexamethylenediisocyanate oligomer containing 40% of the trimer, isocyanate content: 22.6%, manufactured by Sumitomo Bayer Co.), 0.01 g of $Bu_2Sn(OCOC_{11}H_{23})_2$ and 100 g of ziglime, were charged. While maintaining the temperature at 70° C., 55.1 g of an alcohol of the formula $C_nF_{2n+1}C_2H_4OH$ wherein n is a mixture of 6, 8, 10 and 12, and has an average value of 9, was dropwise added over a period of 2 hours by means of the dropping funnel. The stirring was continued for 1 hour, and then 9.12 g of 1,6-hexamethylenediisocyanate and subsequently 9.6 g of 1,6-hexamethylene glycol, were added in 5 minutes. The temperature was raised to 90° C., and the reaction was continued for 2 hours. By the gas chromatography and infrared spectrometer, the conversion of alcohol, glycol and isocyanate was confirmed to be 100%.

The average composition of the reaction product thus obtained, was as follows:

$\Sigma_f NHCO_2[(CH_2)_6O-CONH(CH_2)_6NHCO_2]_2(CH_2)_6OCONH\Sigma_f$ wherein $\Sigma_f$ is $[C_nF_{2n+1}C_2H_4OCONH-(CH_2)_6NHCO]_2N(CH_2)_6$.

1.2 g of the solution of this product was diluted to 200 g with a liquid mixture of acetone/trichlorotrifluoroethane (weight ratio of 80/20) to obtain a treating bath. Then, a nylon knitted cloth (20×20 cm) was immersed in the treating bath, and then dried at 100° C. for 3 minutes. The treated cloth thus obtained, showed an oil repellency of 7, a water repellency-I of 10 and a stain proofing rate of 30.4%.

EXAMPLES 8 to 12

Various reaction products were prepared in the same manner as in Example 7, and a nylon knitted cloth was treated with each of them. The results are shown in Table 6.

COMPARATIVE EXAMPLES 2 to 6

With respect to compounds having various structures as shown in Table 7, the properties were measured in the same manner as in Example 7. The results are shown in Table 7.

TABLE 6

| Example | Structure | Oil repellency | Water repellency | Stain proofing |
|---|---|---|---|---|
| 8 | $\Sigma_f NHCO_2-(CH_2)_6 OCONH(CH_2)_6 NHCO_2-(CH_2)_6 OCONH\Sigma_f$ | 7 | 10 | 28.5 |
| 9 | $\Sigma_f NHCO_2-[(CH_2)_{12} OCONH(CH_2)_6 NHCO_2]_2-(CH_2)_{12} OCONH\Sigma_f$ | 5 | 11 | 21.3 |
| 10 | $\Sigma_f NHCO_2-(CH_2)_4 OCONH(CH_2)_6 NHCONCONH(CH_2)_6 NHCO_2(CH_2)_4 OCONH\Sigma_f$ <br> \|<br> $(CH_2)_6$ <br> \| <br> $NHCO_2C_2H_4R_f$ | 7 | 10 | 27.8 |
| 11 | $\Sigma_f NHCO_2-[(CH_2)_6 OCONH(CH_2)_6 NHCO_2]_2 (CH_2)_6 OCONH\Sigma_f$ | 6 | 11 | 25.1 |
| 12 | 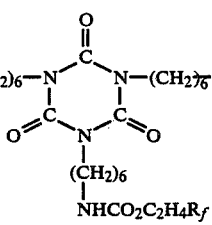 | 6 | 11 | 23.3 |

TABLE 7

| Comparative Example | Structure | Oil repellency | Water repellency | Stain proofing |
|---|---|---|---|---|
| 2 | $R_fC_2H_4OCONH$—⟨ring⟩—$CH_3$, $NHCO_2CH_3$ | 6 | 5 | 28 |
| 3 | $R_fC_2H_4OCONH$—⟨ring⟩—$CH_3$, $CH_3$—⟨ring⟩—$NHCO_2C_2H_4R_f$, $NHCO_2$—$(CH_2)_{12}$—$OCONH$ | 7 | 5 | 28.6 |
| 4 | $\Sigma_f NHCO_2-(C_2H_4O)_4 OCONH-\Sigma_f$ | 7 | 5 | 23 |

TABLE 7-continued

| Comparative Example | Structure | Oil repellency | Water repellency | Stain proofing |
| --- | --- | --- | --- | --- |
| 5 | $\Sigma_f\text{NHCOOCH}_2\text{CH}\underset{\underset{O}{\diagdown\diagup}}{\text{———}}\text{CH}_2$ | 6 | 5 | 28 |
| 6 | $\Sigma_f\text{NHCOOC}_{18}\text{H}_{37}$ | 6 | 5 | 22 |

In Tables 6 and 7, $\Sigma_f$ is $[C_nF_{2n+1}C_2H_4OCONH(CH_2)_6NHCO]_2$—$NCH_{\overline{2)6}}$, and $\Sigma_f'$ is $$C_nF_{2n+1}C_2H_4OCOCONH(CH_2)_6NHCON(CH_{\overline{2)6}}-,$$
$$\underset{C_{18}H_{37}OCONH(CH_2)_6NHCO}{|}$$

and $R_f$ is $C_nF_{2n+1}$ wherein n is a mixture of 6, 8, 10 and 12, and has an average value of 9.0. The water repellency was water repellency-I.

EXAMPLE 13

Into a 1 liter four necked flask equipped with a stirrer, a condenser and a dropping funnel, 110.6 g of Sumidur N-3200, 300.7 g of diethyl succinate and 0.16 g of di-n-butyltin dilaurate, were charged. After heating the mixture to a temperature of 80° C., 509 g of $R_fC_2H_4OH$ wherein $R_f$ is $C_nF_{2n+1}$ wherein n is a mixture of 6, 8, 10 and 12 and has an average value of 9.0, was dropwise added over a period of 2 hours by means of the dropping funnel. Then, 7.4 g of glycidol was added in 30 minutes. One hour later, 17.4 g of 2,4-tolylenediisocyanate was added, and then 12.8 g of ethylene glycol was added in 1 hour, and the stirring was continued for 2 hours. The conversion of the alcohol, glycidol, glycol and isocyanate was confirmed to be 100% by the gas chromatography and infrared spectrometer.

The average composition of the reaction product thus obtained was as follows:

$$\Sigma_f\text{NHCO}_2\text{C}_2\text{H}_4\text{OCONH}-\!\!\!\bigcirc\!\!\!-\text{CH}_3$$
$$\text{NHCO}_2\text{C}_2\text{H}_4\text{OCONH}\Sigma_f''$$

wherein $\Sigma_f$ is $[C_nF_{2n+1}C_2H_4OCONH(CH_2)_6NHCO]_2N(CH_{\overline{2)6}}$ and $\Sigma_f''$ is $$\underset{CH_2CHCH_2OCONH(CH_2)_6NHCO}{\underset{\underset{O}{\diagdown\diagup}}{C_nF_{2n+1}C_2H_4OCONH(CH_2)_6NHCO}}\!\!\diagdown\!\!\text{N}(CH_{\overline{2)6}}-.$$

250 g of the solution of this product, 16.88 g of Nyucoal 780 (manufactured by Nippon Nyukazai K.K.), 2.38 g of $$C_{13}H_{27}\overset{\oplus}{N}H(CH_3)_2\overset{\overset{O}{\|}}{\underset{\ominus}{O}}CCH_3$$

and 692.47 g of water, were passed once through a high shearing homogenizer to obtain a milky white latex (solid content: 15%). Three grams of this latex was diluted with water to 300 g to obtain a treating bath. Then, a nylon knitted cloth (20×20 cm) was immersed therein, and heat-treated at 130° C. for 3 minutes. The treated cloth thus obtained, showed an oil repellency of 7, a water repellency-I of 11 and a stain-proofing rate of 25%.

The water and oil repellant of the present invention is capable of imparting a high level of water and oil repellency by the treatment at a low concentration, and is capable of imparting a particularly high water repellency as compared with conventional products. Such effects can be imparted to a cloth woven with fine denier yarns, which used to be difficult to achieve with the conventional products. Further, the water and oil repellant of the present invention has excellent durability against washing or dry cleaning and is effective in imparting a stain-proofing property, particularly against an aqueous stain, to carpets or various interior articles. It also has a feature that it is capable of imparting a high level of water and oil repellency without impairing the texture of fiber products.

We claim:

1. A high performance water and oil repellant having a molecular weight of from 800 to 20,000 of the formula:

$$\underset{(Z-A^1-CONH)_b}{\overset{(R_f-X-A-CONH)_a}{\diagdown\!\!\diagup}}(W)-NHCO-$$

$$(A^2-B-A^2-CONH-Y-NHCO)_{\overline{m}}A^2-B-$$

$$\underset{(NHCO-A^1-Z)_b}{\overset{(NHCO-A-X-R_f)_a}{A^2-CONH(W)\diagdown\!\!\diagup}}$$

wherein $R_f$ is a perfluoroalkyl group of the formula $C_nF_{2n+1}$, X is —R—, —CON($R^1$)—Q— or —$SO_2$N($R^1$)—Q—, each of A, $A^1$ and $A^2$ is —O—, —S— or —N($R^2$)—, [Z] Z—$A^1$ is a monovalent alcohol, thioalcohol or primary or secondary amine residue, a is an integer of from 1 to 5, b is an integer of from 0 to 4, a +b is an integer of from 1 to 5, W is a t-valent organic residue obtained by removing the t —NCO groups from a t-functional aliphatic, cycloaliphatic, aromatic or heterocyclic isocyanate compound having t —NCO groups, wherein t is an integer of a +b +1, B is a bivalent organic residue obtained by removing the two —$A^2$—H groups from a bifunctional polyvalent active hydrogen compound, and wherein B may have another organic group bonded by $A^2$, Y is a bivalent organic residue obtained by removing the two —NCO groups from a bifunctional aliphatic, cycloaliphatic, aromatic or heterocyclic isocyanate compound, and wherein Y may have another organic group bonded by a —NHCO— group, m is an integer of from 1 to 50, R is a bivalent alkylene group, $R^1$ is a hydrogen atom or a lower alkyl group, Q is a bivalent alkylene group, $R^2$ is a hydrogen atom or a monovalent aliphatic, cycloaliphatic, aromatic or heterocyclic group, or Z and $R^2$ may form a ring.

* * * * *